Figures 3, 7:
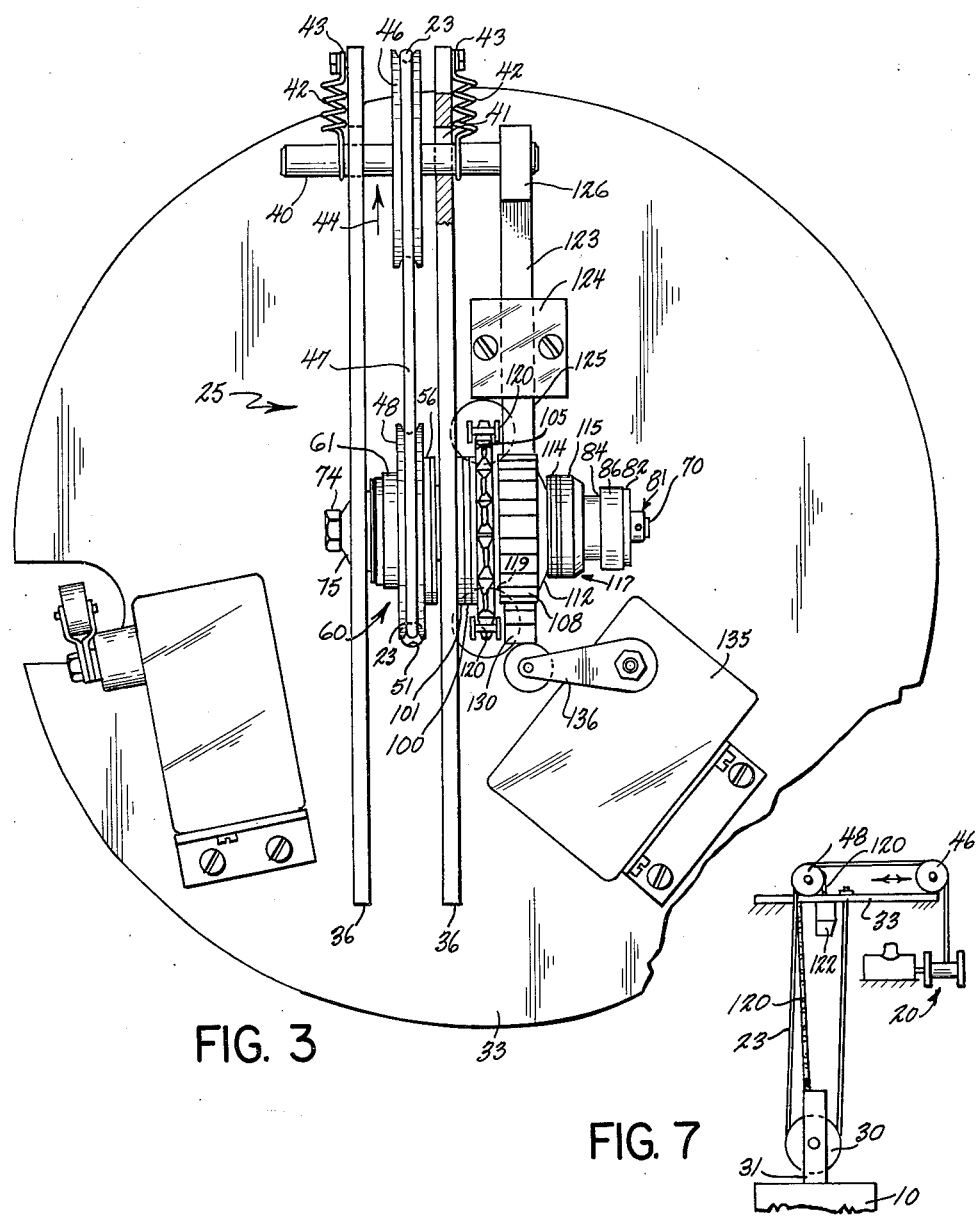

July 19, 1966  K. E. NEUMEIER  3,261,589
SAFETY DEVICE FOR TELESCOPING TUBES
Filed March 2, 1964  3 Sheets-Sheet 1
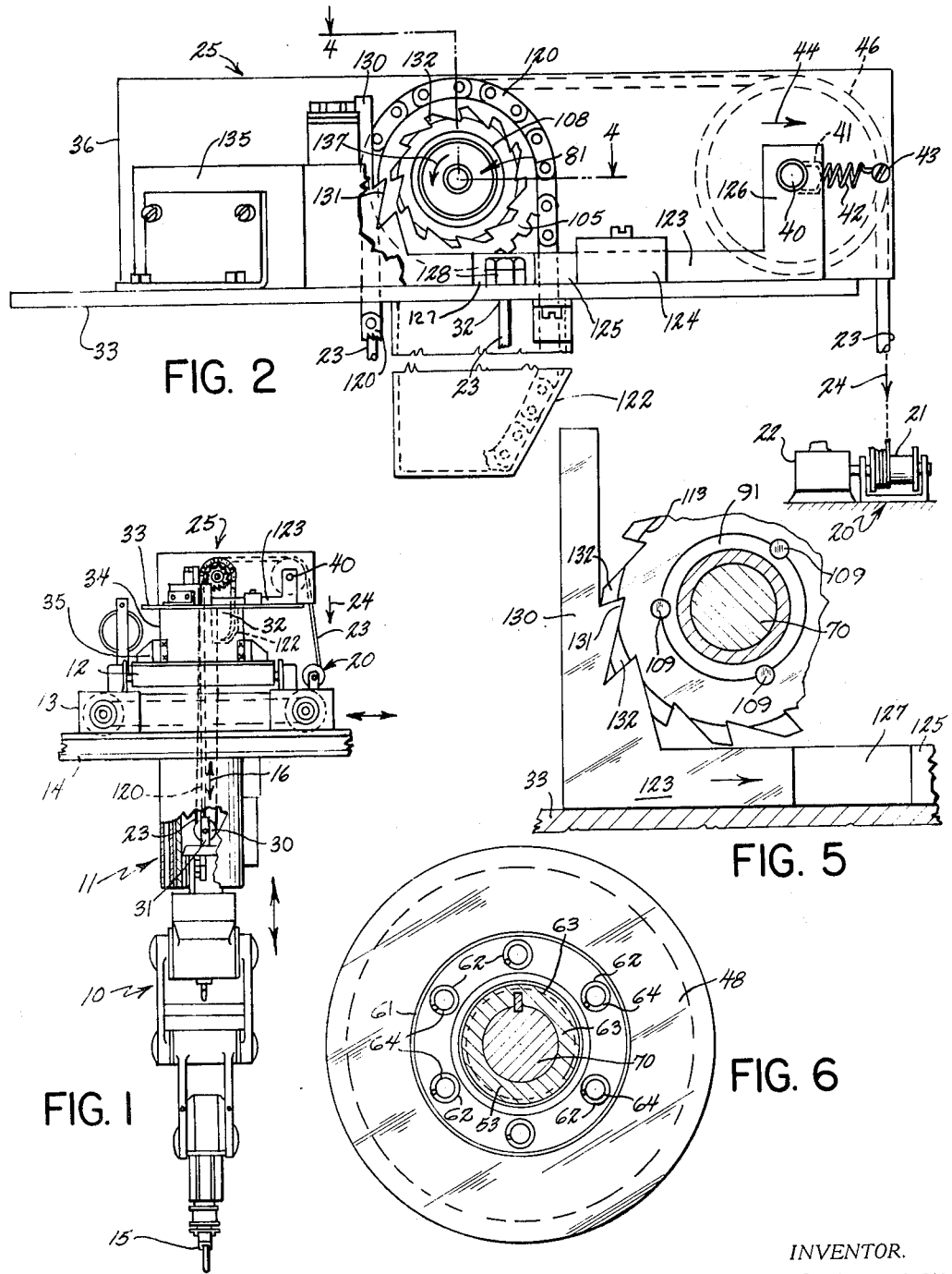
INVENTOR.
KARL E. NEUMEIER
BY
Dugger, Braddock, Johnson & Westman
ATTORNEYS July 19, 1966  K. E. NEUMEIER  3,261,589
SAFETY DEVICE FOR TELESCOPING TUBES
Filed March 2, 1964  3 Sheets-Sheet 2

INVENTOR.
KARL E. NEUMEIER
BY
Dugger, Braddock, Johnson & Westman
ATTORNEYS

July 19, 1966  K. E. NEUMEIER  3,261,589

SAFETY DEVICE FOR TELESCOPING TUBES

Filed March 2, 1964  3 Sheets-Sheet 3

INVENTOR.
KARL E. NEUMEIER
BY
Dugger, Braddock Johnson & Westman
ATTORNEYS

United States Patent Office 3,261,589
Patented July 19, 1966

3,261,589
SAFETY DEVICE FOR TELESCOPING TUBES
Karl E. Neumeier, Stillwater, Minn., assignor to Programmed & Remote Systems Corporation, St. Paul, Minn., a corporation of Minnesota
Filed Mar. 2, 1964, Ser. No. 348,748
17 Claims. (Cl. 254—135)

The present invention has relation to a safety chain for loads which are raised or lowered repeatedly and more particularly to a device which will support a load, such as a manipulator assembly if the normal support device fails.

During the use of heavy devices which are raised or lowered, usually by winches operating cables, there is always the chance that the support member or cable may break. When this happens, the device will usually fall freely and can cause great damage, not only to the device itself but also to the surrounding environment.

In order to avoid accidental damage of this type, the present device has been advanced. The unit, as shown, is made to mount onto the top of a telescoping manipulator support tub assembly. Sheaves are provided for mounting the normal cable used for supporting and raising the manipulator. As shown, a first of the sheaves is mounted onto a shaft which also mounts a sprocket. A chain is passed over the sprocket and is attached to the manipulator assembly. A ratchet wheel is drivably connected to the sprocket through a heavy duty slip clutch. A lug for engaging the ratchet wheel is also slidably mounted on the support for the sprocket and is movable to engaged position under spring pressure whenever load is removed from the cable supporting the manipulator. Thus, if the cable breaks, the lug will engage the ratchet wheel, hold the ratchet wheel from turning, and through the slip clutch, will hold the sprocket. The sprocket in turn will support the weight of the manipulator tube through the chain and prevent the tube from falling freely and causing damage. The chain used is sufficiently strong to support the maximum loads imposed. The slip clutch between the ratchet wheel and the sprocket prevent excessive shock loads.

Suitable mechanism is provided for driving the sprocket, so as to raise the chain (and remove the slack) whenever the manipulator tube is raised. The chain will be payed out when the manipulator tube is lowered under normal circumstances. However, whenever the cable supporting the manipulator breaks or when the load is removed from the cable the ratchet wheel will be held and the sprocket and chain will independently support the tube, within the limits of the heavy duty slip clutch.

It is an object of the present invention to present a safety device for raised and lowered loads, such as manipulators, which will prevent the load from falling freely when the normal support device breaks.

Figure 4:
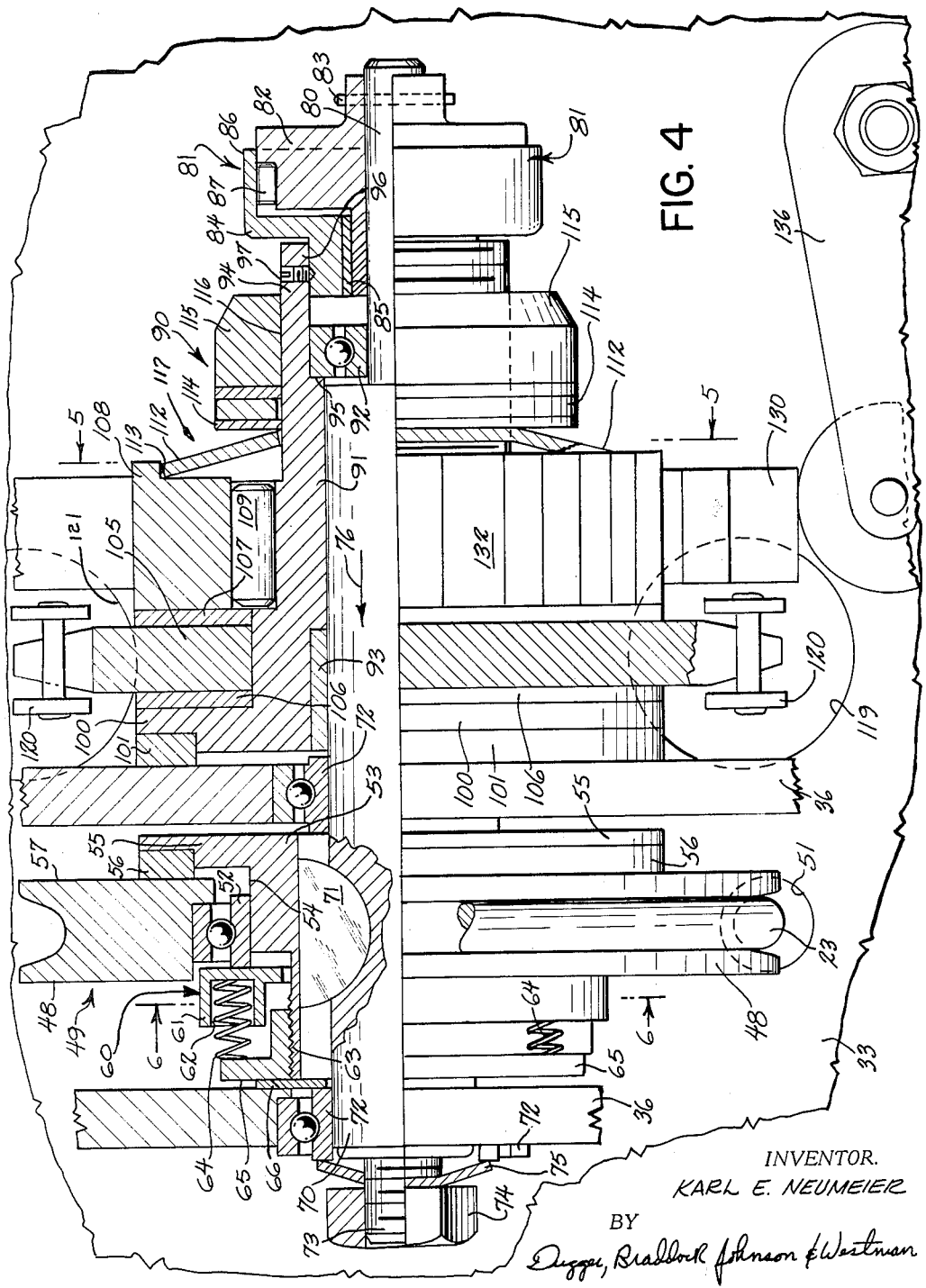

In the drawings:
FIG. 1 is a side elevational view of a typical manipulator installation illustrating a safety device made according to the present invention mounted thereon;
FIG. 2 is an enlarged side elevational view of a form of the safety device of the present invention;
FIG. 3 is a top plan view of the device of FIG. 2;
FIG. 4 is an enlarged sectional view taken as on line 4—4 in FIG. 2;
FIG. 5 is a fragmentary enlarged sectional view of a ratchet wheel and locking dog showing the locking dog in a locked position;
FIG. 6 is a sectional view taken as on line 6—6 in FIG. 4; and
FIG. 7 is a schematic representation of the cable reeving for the manipulator assembly.

Referring to the drawings and the numerals of reference thereon, a manipulator arm assembly 10, which is shown in FIG. 1, is mounted to a plurality of vertically telescoping nested tubes 11 which in turn are supported by suitable mechanism 35 onto a carriage 12. The carriage 12 is carried on provided bridge 13. The manipulator is operable in a usual manner as more fully disclosed in my co-pending application, Serial No. 244,148 for Manipulator Hand, filed December 12, 1962.

The manipulator assembly 10 is a relatively heavy unit and can be utilized for lifting heavy loads through a hand assembly 15 of the manipulator. The manipulator assembly 10 is movable in vertical directions as indicated by double arrows 16. The telescoping tubes 11 are provided to give adequate lateral support to the manipulator as it is lowered and raised.

The manipulator assembly 10 is raised and lowered through operation of a winch assembly 20, which has a winch drum 21 controlled through a motor 22. The motor 22 can be connected to the drum through any suitable gear reduction mechanism, if desired. The motor will be a conventional or preferred reversing motor and when operated in a first direction the motor will rotate to turn drum 21 so that a cable 23 is moved in direction as indicated by arrow 24.

The cable 23 is passed over suitable sheaves, which will be explained more fully as the description proceeds, and which are mounted on a safety assembly 25. The cable 24 will pass downwardly through the interior of the center one of the telescoping tube set 11 and will be mounter over a lower sheave 30 (see FIG. 7) which is rotatably mounted to a bracket 31 which in turn is attached to the manipulator arm assembly 10. Any movement of the cable will cause movement of the arm in vertical directions. Cable 23 is then passed upwardly and is fixed as at 32 to a base support plate 33 which mounts the safety device assembly to the outer tube 34 of the telescoping tube assembly 11. The cable 23 supports the full weight of the manipulator arm and whatever is held by the arm.

When the cable is moved in directions indicated by arrow 24, the telescoping tube assembly and manipulator arm assembly 10 will be moved upwardly at one half the lineal speed of the speed of movement of the cable where it joins drum 21 (because of the two part support line for the manipulator).

The safety assembly 25 includes the base plate 33 which is mounted directly to the outer tube 34. It should be noted that the outer tube 34 is mounted through bracket 35 to the support members for the telescoping tubes and manipulator arm. The outer tube 34 does not move in vertical directions but provides support for the inner tubes which are telescoped within it.

The base plate 33 is fixedly attached in a suitable manner to the tube 34 and has a pair of spaced apart substantially parallel upright brackets 36, 36 mounted to the upper surface thereof. The brackets 36, 36 in turn are utilized to provide mounting members for the mechanism necessary to accomplish the purposes of this invention.

A shaft 40 is slidably mounted through elongated slots 41 in the brackets 36, 36 and is made so that it does not rotate with respect to the brackets. A pair of coil springs 42, 42 are mounted to the shaft 40 at first ends thereof and each spring extends to be attached as at 43 to one of the brackets 36, 36. Each of the springs 42, 42 is positioned on the outside of one of the brackets. The springs 42, 42 urge the shaft 40 in direction as indicated by arrow 44. The shaft extends outwardly beyond the sides of the brackets a substantial distance.

A sheave 46 is rotatably mounted through a suitable bearing (not shown) to the shaft 40 and is positioned on the shaft between brackets 36, 36. The cable 23 coming from the winch assembly 20 is passed over the top of the sheave 46. The cable extends from sheave 46 and has a horizontally extending length 47 which in turn is passed over a second sheave 48. The cable then passes downwardly through a provided opening 51 in plate 33 and into the interior of a center of one of the telescoping tube set 11 and over sheave 30, as previously explained. Any tension in cable 23 (length 47) will tend to move sheave 46 and shaft 40 in direction opposite that indicated by arrow 44 against the bearing of springs 42. The shaft 40 will usually be as shown in FIG. 3, against the end of slots 41 adjacent sheave 48.

As can perhaps best be seen in FIG. 4, the sheave at 48 is mounted onto a hub assembly illustrated generally at 49. The sheave 48 is mounted on a suitable bearing 52, which in turn is axially slidably mounted onto a first hub 53. The inner race of bearing 52 is slidably mounted over a center portion 54 of the hub. The outer race of the bearing is pressed into the sheave 48.

The hub 53 has an inner radially extending disc-like flange 55 which is integral therewith. An annular ring 56 of suitable friction material is positioned between an inner surface of the flange 55 and a surface 57 of the sheave 48. As can be seen in FIG. 4, the radial flange 55 can be provided with a suitable shoulder to support the friction ring 56 in position.

The sheave 48 is resiliently urged toward the friction ring 56 through the use of a spring loaded assembly illustrated generally at 60. The assembly 60 includes a spring retainer 61 which, as perhaps best seen in FIG. 6, has six spring-retaining pockets 62 annularly positioned adjacent the periphery thereof. The spring retainer 61 is slidably mounted over an outer end portion 63 of the hub 53. The end surface of the spring retainer 62 bears against the inner race of bearing 52. A plurality of springs 64 are mounted in the spring retainer (one in each of the pockets 62) and the springs extend outwardly therefrom in axial direction. A spring retainer nut 65 is threadably mounted on provided threads onto the outer end portion 63 of the hub 53. The nut 65 has a radial flange which bears against the outer ends of springs 63. By threading the nut 65 to the desired position, the springs 63 will urge spring retainer 61 against the inner race of bearing 52 and thereby urge the sheave 48 against friction material 56. Thus, the sheave 48 is frictionally driven with respect to the hub 53, and at a comparatively low torque.

The hub assembly 49 is drivably mounted onto a shaft 70 with a suitable key 71. The key 71 is longitudinally slidably mounted in a key way on the hub member 53.

The shaft 70 is rotatably mounted to the brackets 36, 36 through suitable bearings 72, 72. The shaft is slidable with respect to the inner races of the bearings 72 in longitudinal or axial direction, the purpose of which will be more fully explained as the description proceeds. The outer end portion 73 of the shaft is of reduced diameter and a nut 74 is threadably mounted onto this reduced portion. Nut 74 bears against a Belleville type spring washer 75 which in turn bears against the inner race of the adjoining bearing 72 and urges the shaft in direction as indicated by arrow 76.

A suitable bushing washer 66 is positioned between the nut 65 and its associated bracket 36 to permit the first hub assembly 49 to rotate without damage.

As can be seen, the end of the shaft 70 opposite nut 74 extends substantially beyond the brackets 36. The second end portion 80 of shaft 70 is also reduced in diameter. At the outer end of the reduced portion 80 a one-way clutch assembly 81 is mounted.

The one-way clutch assembly includes an inner race or drive member 82, which is pinned with a suitable pin 83 to the outer end of the shaft portion 80. An outer race 84 of the one-way clutch assembly (or the driven member) is rotatably mounted with respect to the shaft portion 80 on a suitable bushing 85 and has an annular flange 86 which extends over the inner race 82. Camming elements illustrated representatively in 87 are mounted with respect to the inner and outer races of the one-way clutch assembly so that when the drive member or inner race 82 rotates in a first direction, the camming elements will move to position wherein they engage drive member 82 and the annular flange 86 of the outer race and drive the outer race 84. When the inner race or driving element 82 is rotated in the opposite direction, the camming elements 87 will move to position wherein they will not engage and drive the annular flange 86 and thereby will not drive the outer race 84. The hub can rotate freely in a second direction with respect to the drive member 82.

The one-way clutch assembly as shown, is a commercially available one-way clutch sold by the Formsprag Company, 292 Lafayette Avenue, New York City, New York, their model FS02 R.H. Any suitable or preferred one-way clutch assembly can be utilized.

A second chain drive mounting hub assembly 90 is driven by the one-way clutch and is slidably mounted over the outer end of shaft 73. The hub assembly 90 includes a second hub member 91 which is axially slidably, rotatably mounted over the shaft 70 on a suitable bearing 92 at the outer end thereof (adjacent one-way clutch assembly 81) and with a suitable bushing 93 at the inner end thereof (adjacent one of the brackets 36). The outer end portion 94 of the hub 91 is recessed and forms a shoulder 95 against which the outer race of bearing 92 is abutted. The outer end 94 is mounted as at 96 over an outwardly extending portion of the outer race 84 of the one-way clutch assembly 81. When the unit is in its desired position a set screw 97 is utilized for locking the hub 94 and the outer race 84 of the one-way clutch assembly from axial or rotational movement with respect to each other.

The inner end of the second hub member 91 has a radially extending flange 100. An annular friction disc 101 is positioned between a notched portion of the flange 100 and the second one of the brackets 36, 36. The inner and outer races of the one-way clutch assembly 81 are restrained from movement in direction along the axis of shaft 70, with respect to each other, and inner drive member 82 of one-way clutch 81 bears against the inner race of bearing 92.

It can now be seen that the Belleville washer 75, which acts against bearing 72 in a first of the brackets 36 will urge the shaft in direction indicated by arrow 76 and this force in turn will be transmitted through the pin 83, the one-way clutch assembly 81, bearing 92 and shoulder 95 to the hub 91. This in turn will cause the flange 100 to move toward its adjacent bracket 36 and will exert a resilient frictional force against the friction disc 101. This friction force is relatively low but prevents free rotation of the hub assembly 90.

A chain sprocket 105 is rotatably mounted with respect to the hub 91. A friction disc 106 is positioned between the outer surface of radial flange 100 and the adjacent surface of sprocket 105. A second friction disc 107 is positioned on the outside surface of sprocket 105. A ratchet wheel 108 is longitudinally slidable rotationally drivably mounted onto the hub 91 and has a surface engaging friction disc 107. Ratchet wheel 108 is mounted to the hub 91 through the use of a plurality of pins 109 (three pins are used) which are mounted in holes partially drilled into the hub 91 and partially drilled into the ratchet wheel 108. The pins are a longitudinal slide fit so that the ratchet wheel can slide in direction parallel to the longitudinal axis of the shaft 70 and the hub 91. The ratchet wheel will not rotate with respect to the hub 91.

A heavy Belleville spring washer 112 is positioned against the outer surface of the ratchet wheel 108 and fits within a recess 113 on the ratchet wheel.

A thrust bearing assembly 114 is mounted over the hub 91 and bears against the inner portions of the Belleville spring washer.

A nut 115 is threadably mounted as at 116 over the outer end 94 of the hub 91 and upon tightening nut 115, it will act through thrust bearing 114 to compress the spring 112 against the ratchet wheel and thereby frictionally tighten the sprocket 105 between the two friction discs 106 and 107. The sprocket 105 will not rotate with respect to the hub 91 or with respect to the ratchet wheel 108 unless the force on the sprocket exceeds the frictional force applied to it through the discs 106 and 107. These friction discs 106 and 107 together with the spring 112 and nut 115 provide a heavy duty, high capacity slip clutch assembly 117 that provides friction drive between the ratchet 108 and the sprocket 105. A chain 120 is drivably mounted over sprocket 105 and extends downwardly through an opening 119 in plate 33 the interior of the inner tube of the telescoping tube set 11. The chain is fixedly attached to the bracket 31 on which the sheave 30 is mounted. Therefore there is a direct mechanical connection between the sprocket 105 and the arm assembly 10.

The chain 120 passes over the sprocket 105 and passes through a provided opening 121 in plate 33 to a provided chain storage bucket 122 which in turn is attached to the bottom surface of plate 33.

As can be seen in FIGS. 2, 3 and 4, a locking slide 123 is slidably mounted on the upper surface of plate 33 and is slidably mounted through a suitable guide bracket 124. The locking slide has a longitudinally extending portion 125, and has an upright end portion 126 which is mounted onto shaft 40 at the outer end thereof. The shaft 40, as stated previously, is slidable in slot 41 and therefore the locking slide assembly will be moved whenever the shaft 40 moves in its slot. The portion 125 is notched as at 127 to clear nuts 128 used for holding cable 23 to the plate 33.

As can be seen in FIGS. 2 and 5, the inner end of the locking slide assembly 123 has an upright member 130 which is aligned with the ratchet wheel 108. The surfaces of the upright member 130 which are adjacent the ratchet wheel have provided dogs or lugs 131 which would mate with the teeth 132 on the ratchet wheel and prevent the ratchet wheel from rotating when they engage. As can be seen in FIG. 2 with the locking slide in this position shown therein, the ratchet wheel is free to rotate. In FIG. 5, the locking slide is shown in position wherein the dogs 131 engage the teeth 132 and will hold the ratchet wheel from rotating. This is in the locked position of the ratchet wheel. The ratchet wheel and locking slide provide latching or locking means for holding the sprocket 105 (through slip clutch 117) from rotation in direction to permit the chain to be payed out when the tube assembly lowers.

A suitable microswitch 135 has an actuator 136 which rides on the end surface of the upright member 130. With the upright member in its unlatched position the microswitch 135 is closed. When the upright member moves to position shown in FIG. 5, the actuator 136 will move so that the microswitch 135 will be open. The microswitch is wired so that it will disable the motor controls for the winch.

*Operation*

During normal operation of the winch assembly 20, it can be seen that cable 23 will be under tension, because of the load from the manipulator arm 10 which it supports. This will cause tension in the horizontal section 47 of the cable and result in sliding movement of the shaft 40 against the action of springs 42 in direction opposite that indicated by arrow 44 to the end of the slot in which it rides, as shown in FIG. 3, so that the upright member 131 is not engaged for position to interfere with the teeth 132 of the ratchet wheel. As the cable 23 is payed out from the winch drum 21 and the arm assembly 10 lowered, each of the sheaves 46 and 48 will rotate. Rotation of the sheave 48 will, through the friction drive of the hub assembly 49, rotate shaft 70 and inner race 82 of the one-way clutch assembly 81. Clutch assembly 81 is set so that when the sheave 48 is rotating in direction as indicated by arrow 137 (FIG. 2), as the arm 10 lowers, it will not drive the outer race 84. In other words, as the arm lowers there will be no driving connection to sprocket 105. As the arm lowers the shaft 70 is rotated and, because the cable is double reeved (as will be more fully explained) the shaft 70 is rotating faster than is necessary for the sprocket to rotate in order to feed out enough chain. The clutch does not drive the sprocket but will permit the sprocket to rotate in direction as indicated by arrow 137 until it overruns the shaft. In order to prevent this excess rotation of sprocket 105, the friction brake between flange 100 and disc 101 is provided.

The chain will be pulled down along with the arm through bracket 31. The chain will then pull on the sprocket and attempt to rotate the sprocket (it can be rotated up to the speed of shaft 70). Then the sprocket will drive through is discs 106 and 107 to the hub 91. The flange 100 of hub 91 will slip with respect to friction disc 101 as the chain is payed out. The Belleville spring 75 controls the downward force necessary to remove chain from the chain bucket as the sprocket rotates. This keeps a tension on the chain 120 and prevents slack from occurring. The force necessary to rotate the entire hub assembly 90 is less, by a considerable amount, than the force necessary to rotate the sprocket 105 with respect to the discs 106 and 107 (slip clutch assembly 117) and therefore the slipping will take place between the radial flange 100 and the disc 101.

When the cable 23 is raised through reversing of motor 22, the arm 10 will be lifted and sheave 48 will rotate in opposite direction. This also will tend to rotate shaft 70 through hub assembly 49 and key 71. This will rotate the inner race 82 of the one-way clutch assembly 81 in opposite direction from that indicated by arrow 137. The one-way clutch assembly is set so that the camming elements 87 will then drive outer race 84 and in turn this will drive the hub 91 through the provided linkage, thereby rotating sprocket 105 and hub 91 (which will slip against friction disc 100) and lifting the chain 120 from inside the tube as the arm assembly comes up. The friction drive from sheave 48 to hub assembly 49 must carry sufficient torque to overcome the friction between flange 100 and friction disc 101. It will be noted that with the double reeving of the cable over the pulley 30 the lineal movement of cable 23 across sheave 48 will be twice as great as the lineal movement of the chain 120 in vertical direction. Therefore, the sheave 48 will be rotating faster than is necessary for the sprocket 105 to recover the chain as the arm raises. When the sheave 48 is rotated faster than the shaft 70 can rotate (the shaft is drivably connected to the sprocket 105) the sheave 48 will slip against frictional material 56 and will overrun the sprocket. Thus the chain 120 is always kept under uniform tension due to the frictional slipping of the sheave 48 with respect to the flange 55 of the hub 53, which in turn is drivably mounted to the shaft 70. The shaft is drivably connected to the sprocket 105 through one-way clutch assembly 81.

Whenever the cable 23 becomes slack, either because of breakage or because the arm has reached a stopped position, there will be no cable tension tending to move the shaft 40 against the resilient action of springs 42, 42. Springs 42 will then pull the shaft 40 in direction as indicated by arrow 44 and this will also move the locking slide assembly 123 in this direction. Two things will then occur, microswitch 135 will be opened disabling the motor to the winch. The dogs 131 on the locking slide will engage the teeth 132 on the ratchet wheel. When this happens, the ratchet wheel will no longer be free to rotate in direction as indicated by arrow 137. Inasmuch as the ratchet wheel is pinned to prevent rotational movement with respect to the hub 91, the hub cannot rotate in direction as indicated by arrow 137. It can rotate in opposite direction, if necessary, because of the angles on the back side of teeth 32.

If the cable has broken, the arm assembly 10 will tend to free fall downwardly and will tend to pull the chain 120 along with it. Inasmuch as the chain 120 is wrapped over sprocket 105 the sprocket 105 will have to rotate in direction as shown by arrow 137 or else the arm assembly 10 will be suspended from the chain. The ratchet wheel 108 is locked to prevent this rotation and therefore if the sprocket 105 is to rotate, it must frictionally slip between discs 106 and 107 (slip clutch assembly 117). The force necessary to rotate this sprocket wheel through slip clutch 117 is very great and under normal circumstances the sprocket will not rotate and will support the manipulator arm assembly 10 independently of the cable. The sprocket, however, will slip slightly under shock loading and therefore excessive stresses on the chain 120 are avoided because of a sudden drop of a manipulator arm.

Also, it will be noted that there may be a slight rotation permitted before the locking dogs 131 move to position wherein they will fully engage the teeth 132. This slight movement will create a shock load condition on the chain and sprocket and the friction discs 106 and 107 will absorb this shock without damage to the mechanism.

The manipulator will thus be held against free falls if the normal support cable should break.

The sprocket and ratchet wheel can, if desired, be mounted onto a separate shaft and other mechanism used to drive the unit to recover chain when the manipulator arm is raised. The latch dogs which move to engage a ratchet wheel and the frictionally loaded sprocket would operate substantially as disclosed.

As many different embodiments can be utilized for carrying out the invention application is limited only by the appended claims.

What is claimed is:

1. A safety device for loads lifted by a support member attached to the load and mounted to a frame for supporting the load, said device including a movable element which moves to a first position when said support member is under a load, bias means urging said movable element to a second position, load arrester means on said support frame, a safety element attached at a first end thereof to said load and to the load arrester means at a second end thereof, means to raise said safety element a distance equal to the distance said load is lifted, whenever said load is lifted in an upwardly direction, said movable element moving to its second position to actuate said load arrester to prevent movement of said safety element whenever said support member is not under load.

2. The combination specified in claim 1 wherein said safety element is a chain and said load arrester means includes a sprocket rotatably mounted on said support member, a ratchet wheel frictionally drivably engaging the side surface of said sprocket, and a dog member positioned to engage said ratchet wheel to prevent rotation of the ratchet wheel in direction to permit downward movement of the first end of the safety chain whenever the movable element moves to its first position.

3. The combination specified in claim 2 wherein the sprocket is driven in direction to retrieve said chain through a mechanical linkage which rotates whenever the support member is moved upwardly.

4. A safety device for loads lifted by a cable attached to the load and passing over a sheave rotatably mounted on a frame above the load, said device including a movable element which moves to a first position when said cable is under tension, bias means urging said element to a second position, load arrester means on said support frame, a safety chain attached at a first end thereof to said load and to the load arrester means at a second end thereof, means to raise said safety chain a distance equal to the distance said load is lifted whenever said load is lifted in a vertical direction, said movable element moving to its second position to actuate said load arrester means to prevent downward movement of said safety chain whenever said cable is not under tension.

5. The combination as specified in claim 4 wherein said load arrester means is comprised as a sprocket rotatably mounted on said support, said safety chain passing over and drivably engaging said sprocket, a ratchet wheel rotatably mounted on said support, friction drive means between said ratchet wheel and said sprocket to cause said ratchet wheel to rotate in the same direction on said sprocket, said friction drive means being capable of carrying the maximum torque applied to said sprocket when the chain supports said load independently of said cable, and a latch dog mounted with said ratchet wheel and movable to and from latched position wherein the ratchet wheel is prevented from rotating in direction to permit said sprocket to rotate and feed said safety chain downwardly, said latch dog being moved by said movable element to latched position whenever the cable is not under tension.

6. A safety device for manipulators lifted by a support member which is mounted to a frame above the manipulator and has a free end extending downwardly to support the manipulator, the support member being movable in vertical directions, said device including a movable element which moves to a first position when said support member is under load, bias means urging said movable element to a second position, a safety chain attached at a first end thereof to said manipulator, means to raise said safety chain whenever said manipulator is lifted in a vertical direction, a distance equal to the distance said manipulator is lifted, and latch means on the support and movable to a position to prevent feed of the first end of the safety chain downwardly, said movable element moving to its second position to actuate said latch means to prevent downward movement of said safety chain whenever said support member is not under load.

7. A safety device for a manipulator which is movable in vertical directions through operation of a cable supported by an upper support member and attached to said manipulator, said safety device including means to rotatably movably mount a sheave over which said cable passes on said support member, bias means urging said sheave toward a first position, said sheave being movable against said bias means to a second position whenever said cable is under tension, a chain member capable of supporting the tension load from said manipulator attached to said manipulator, a sprocket rotatably mounted on said support member, said chain being passed over said sprocket on said support member, means to rotate said sprocket to remove slack from the chain whenever the manipulator assembly is moved upwardly, a latch member frictionally drivably engaging said sprocket, and a latch dog actuated by movement of said sheave, said latch dog being movable to position wherein it does not engage said latch member whenever said sheave moves to its second position, and said latch dog being movable with said sheave under urging of said bias means to a position wherein it engages and locks said latch member to prevent rotation of said sprocket in direction to permit said chain to move downwardly with the load whenever the cable supporting the manipulator is slack.

8. A safety device for arresting a load which is movable in vertical directions through powered operation of a cable supported at an upper support member and attached to said load, said safety device including means to rotatably movably mount a sheave on said support member, said cable being passed over said sheave, bias means urging said sheave toward a first position, said sheave being mounted so that it is movable against said bias means to a second position whenever said cable is supporting said load, a chain member capable of independently supporting the load attached to said cable, a sprocket rotatably mounted on said support member, said chain being passed over said sprocket on said support member, means to rotate said sprocket to remove slack from the chain whenever the load is moved upwardly by the cable, a latch member frictionally drivably associated with said sprocket, and a latch dog actuated by movement of said sheave, said latch dog being movable to position wherein it does not engage said latch member whenever said sheave moves to its second position and said latch dog being movable with said sheave under urging of said bias means to a position wherein it engages and locks said latch member to prevent rotation of said sprocket in direction to permit feed of said chain downwardly with said load whenever the cable supporting the load is slack.

9. The combination specified in claim 8 wherein said latch means for said sprocket is comprised as a ratchet wheel frictionally drivably engaging the side surface of said sprocket.

10. The combination specified in claim 8 wherein the sprocket is driven in direction to retrieve said chain through a mechanical linkage which rotates whenever the cable is moved.

11. The combination specified in claim 10 wherein the mechanical linkage includes a separate sheave drivably associated with said cable and rotated whenever the cable is moved longitudinally, and friction drive means between said sheave and said sprocket to permit rotation of said sheave at a speed faster than the rotation of said sprocket whenever the upward force on said chain exceeds a predetermined amount.

12. A safety device for manipulators that are controlled for vertical movement through the use of a winch controlled cable attached to the manipulator and which is supported on a support member above the manipulator, said safety device including a sheave rotatably mounted on said support member and over which the cable supporting said manipulator will pass, said sheave being yieldably mounted, bias means urging said sheave toward a first position, said sheave being movable to a second position against said bias means whenever the cable is under tension, a sprocket rotatably mounted on said support member, a chain mounted over said sprocket and having a first end thereof attached to said manipulator, means to drive said sprocket in direction to take up the slack in said chain whenever said manipulator assembly is moved upwardly by said cable, releasable latch means to prevent rotation of said sprocket in direction to permit feed of the first end of said chain downwardly, said releasable means being movable to released position, and means connecting said releasable latch means to said sheave so as to move said latch means to a locked position preventing rotation of said sprocket in direction to cause downward feed of the first end of said chain whenever the bias means moves said sheave to its first position, said latch means being moved to released position whenever said sheave is moved to its second position.

13. The combination specified in claim 12 wherein said lock means for said sprocket is comprised as a ratchet wheel frictionally drivably engaging the side surface of said sprocket, and a dog member positioned to engage said ratchet wheel whenever the sheave moves to its first position.

14. The combination specified in claim 12 wherein the sprocket is driven in direction to retrieve said chain through a mechanical linkage which rotates whenever the cable is moved.

15. The combination specified in claim 14 wherein the mechanical linkage includes a sheave drivably associated with said cable and rotated whenever the cable is moved, and friction means between said sheave and said sprocket to permit slipping of said sheave with respect to said sprocket whenever the upward force on said chain exceeds a predetermined amount.

16. The combination specified in claim 15 wherein said mechanical drive means between said sheave and said sprocket includes a one-way clutch assembly which will drive said sprocket in direction to lift the chain attached vertically and will permit said sprocket to rotate freely in opposite direction, and friction means on said sprocket to prevent such free rotation except when the force urging said chain downwardly exceeds a predetermined amount.

17. A safety device for manipulators that are vertically movable and have a cable winch, a cable controlled by the winch and having a free end portion attached to the manipulator, said safety device including a frame for supporting said manipulator, a first shaft rotatably mounted on said frame, a first sheave rotatably mounted on said first shaft, said winch controlled cable being passed over said first sheave, first friction drive means for drivably connecting said first sheave to the first shaft, a second shaft rotatably mounted on said frame in spaced relationship to said first shaft, said second shaft being movable in directions toward and away from said first shaft, bias means urging said second shaft to a first position, a second sheave rotatably mounted on said second shaft, said cable being passed from said first sheave, over said second sheave and thence to the winch, said second sheave and said second shaft being movable to a second position against action of said bias means whenever said cable is under tension, a hub rotatably mounted on an outwardly extending portion of said first shaft, a one-way clutch assembly mounted between said shaft and hub so as to drive said hub when the shaft rotates in a first direction, and permitting free rotation of said hub with respect to said shaft in a second direction, second friction means between said frame and said hub to prevent said free rotation of said hub in said second direction until torque on said hub exceeds a predetermined minimum, a sprocket member rotatably mounted on said hub, a chain drivably mounted over said sprocket and having a first end thereof attached to said manipulator, a second end portion of said chain being stored in a receptacle positioned below said sprocket, a ratchet wheel drivably mounted on said hub, third friction drive means between said ratchet wheel and said sprocket, said third friction drive means being capable of carrying a torque sufficient to restrain said sprocket from rotational movement whenever the chain on said sprocket supports the full weight of said manipulator, a slide member longitudinally slidable mounted on said frame, said slide member having a first upright member connected to said second shaft, said slide member having a second upright member aligning with said ratchet wheel, the second upright member having an inner surface thereof defining latching dogs of size to engage teeth on said ratchet wheel, said slide member being movable to a first latched position wherein the dogs on said slide member engage said ratchet wheel teeth whenever said shaft is moved to its first position under urging of said bias means, and said slide member being movable to a second position wherein said dogs on its second upright member no longer engage the teeth on said ratchet wheel whenever the second shaft moves to its second position and said chain is under tension, said first sheave being rotated whenever said cable is moved in direction to raise said manipulator at a speed which exceeds the speed of rotation of said sprocket necessary to remove the slack from said chain, said first friction drive means between said sheave and said shaft being set to slip at a torque considerably lower than the torque capacity of said third friction drive means.

References Cited by the Examiner

UNITED STATES PATENTS

| | | | |
|---|---|---|---|
| 2,998,753 | 9/1961 | Knaub | 254—168 |
| 3,203,672 | 8/1965 | Santos | 254—168 |

EVON C. BLUNK, Primary Examiner.

H. HORNSBY, Assistant Examiner.